United States Patent
Beddus et al.

(12)
(10) Patent No.: US 6,785,375 B1
(45) Date of Patent: Aug. 31, 2004

(54) COMMUNICATIONS SYSTEM

(75) Inventors: Simon Alexander Beddus, Suffolk (GB); Fenela Wills, Suffolk (GB); Gary Leslie Bruce, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/581,643

(22) PCT Filed: Jan. 8, 1999

(86) PCT No.: PCT/GB99/00058

§ 371 (c)(1),
(2), (4) Date: Jun. 15, 2000

(87) PCT Pub. No.: WO99/37081

PCT Pub. Date: Jul. 22, 1999

(30) Foreign Application Priority Data

Jan. 14, 1998 (GB) .............................................. 9800803

(51) Int. Cl.$^7$ ........................... H04M 7/00; H04L 12/28
(52) U.S. Cl. ................... 379/220.01; 379/219; 370/400
(58) Field of Search .......................... 379/265.01–266.1

(56) References Cited

U.S. PATENT DOCUMENTS

| | | | | | |
|---|---|---|---|---|---|
| 5,848,143 A | * | 12/1998 | Andrews et al. | ........ | 379/265.09 |
| 6,011,844 A | * | 1/2000 | Uppaluru et al. | ...... | 379/220.01 |
| 6,094,479 A | * | 7/2000 | Lindeberg et al. | ..... | 379/220.01 |

* cited by examiner

*Primary Examiner*—Ahmad F. Matar
*Assistant Examiner*—Hector Agdeppa
(74) *Attorney, Agent, or Firm*—Nixon & Vanderhye P.C.

(57) ABSTRACT

A computer telephony interface includes both first party and third party call components. A telephony server is arranged to control one or more of plural network nodes and has a control interface having a call model and call components for (a) at least one first party call and (b) at least one third party call. First and third party call components are linked to a single call model.

6 Claims, 8 Drawing Sheets

COMMUNICATIONS SYSTEM

BACKGROUND OF THE INVENTION

1. Field of the Invention

The present invention relates to a communication system, and in particular to a computer telephony interface (CTI) for use in such a system.

2. Related Art

A computer telephony interface is a control interface used on a computer which implements or controls one or more nodes in a communications network, For example, Microsoft's TAPI (telephony application programmer's interface) might be used in conjunction with a program such as NetMeeting (TRADEMARK) to control a PC used for audio/visual communication with other PCs connected, e.g., to an Intranet. Such a control interface is known as a "first party call component" since it models and controls a call from the point of view of one of the parties involved in a connection. Alternatively, a call may be modelled and controlled from a platform which is not either an originating or a destination node in the call. For example, calls using the H323 protocol may be made via a computer platform which is dedicated to a call switching function and which is termed a "virtual switch" (sometimes also termed a "gatekeeper"). Such a virtual switch may have a control interface constructed using, for example the Java telephony application programmers interface (JTAPI). This is an example of a third party call component, since the control of the call is based on a view of the call which is not that of either the originating or the destination party.

BRIEF SUMMARY OF THE INVENTION

According to a first aspect of the present invention there is provided a computer telephony interface (CTI) including concurrent first party call components and third party call components.

The invention provides for the first time a control interface which uses concurrently both first party call components and third party call components. Conventional PBX and public networks have been controlled from either the first or third party. However since network functionality is distributed across many components, the ability given by the present invention to control more than one node or switch makes possible control and use of the full functionality of a computer implemented/computer-controlled communications network.

According to a second aspect of the present invention there is provided a computer telephony interface including a plurality of concurrent call components for a plurality of different respective network nodes active in a call.

Preferably the plurality of concurrent call components include first party call components and third party call components.

Preferably one of the said call components is arranged to control a network resource operating a multi-call communications protocol.

The limitations of conventional computer telephony interfaces are particularly marked when used to control devices implementing a multi-call protocol. A multi-call protocol is one which allows a respective network node to engage in more than one call at a time. An example of such a multi-call protocol is H.323 used in Microsoft's Net Meeting and in other audio/visual conferencing applications.

Preferably the different call components are sub-classes of a single call component parent class.

According to another aspect of the invention, there is provided a telephony server for connection in a telecommunication system and including a computer telephony interface according to any one of the preceding aspects.

According to a further aspect of the invention there is provided a communications system including a computer controlling a plurality of different network resources, in which the computer includes a computer telephony interface in accordance with any one of the preceding aspects of the invention.

According to another aspect of the present invention, there is provided a method of operating a computing system connected to a communications network, the method comprising:

a) selecting one or more of a plurality of call components comprising both first party call components and third party call components;

b) incorporating the or each selected call component in a call model running on the computing system c) controlling via the said call model network resources corresponding to the or each selected call component, and thereby establishing a call in the said communications network.

The invention also encompasses methods of operating a network, or operating network nodes, using the computer telephony interface of the previous aspects.

DESCRIPTION OF THE DRAWINGS

Systems embodying the invention will now be described in further detail, by way of example only, with reference to the accompanying drawings.

DESCRIPTION OF EXAMPLES

Figure 1A:
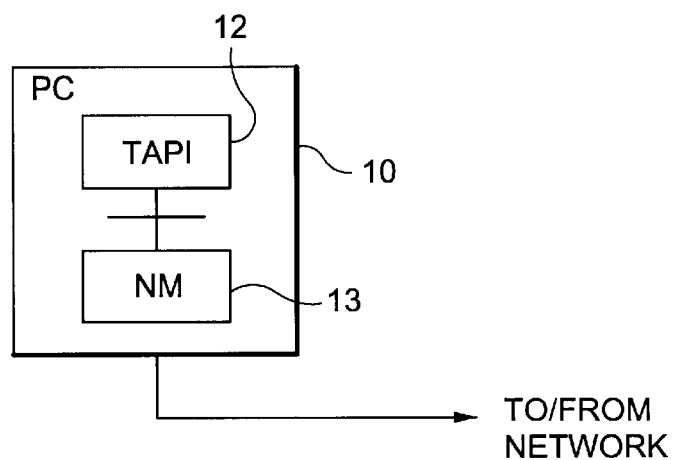
FIGS. 1A and 1B are schematics showing prior art communications systems.

FIG. 1A shows a personal computer 10 having a connection 11 to a communications network which may be, for example, a corporate Intranet. In this prior art example, the communications client running on the PC is Microsoft's "NetMeeting". Microsoft's telephony application programmers interface (TAPI) 12 is used to control the NetMeeting client 13. The TAPI interface may in turn be controlled by a higher level application programme, such as, for example, a personal information manager application which might use TAPI and NM to initiate a call to a destination number read from an address book. The TAPI interface in this example models and controls the operation of the NM client from the point of view of an originating node in a call. It has only a limited view of the network and of other nodes, based on returned information from the network. The TAPI interface to the NM client constitutes in this example a first party call component.

Figure 1B:
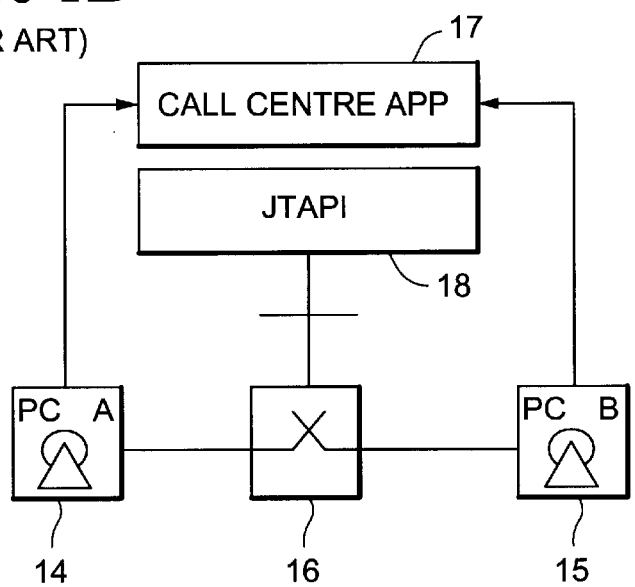

FIG. 1B shows a communications system developed by BT for use in telemarketing call centres and known as "Melody". PC nodes 14, 15 are connected via a data network (using for example ethernet) to a computer 16 which functions as a virtual switch. The personal computers 14, 15 use Internet phone clients for communication with each other via the switch 16. They also communicate with a call centre application 17 running on a telephony server. The call centre application controls the virtual switch 16 using a computer telephony interface constructed Sun's Java telephony application programmers interface (JTAPI) 18. The JTAPI interface is dedicated to controlling the virtual switch 16 and so constitutes a third party call component.

The system shown in FIG. 1B is described and claimed in the present applicant's co-pending international parent application number PCT/GB97/01884 "Processing Device Network" filed Jul. 11, 1997 (now U.S. Pat. No. 6,407,996). The contents of this earlier application are incorporated herein by reference.

Figure 2:
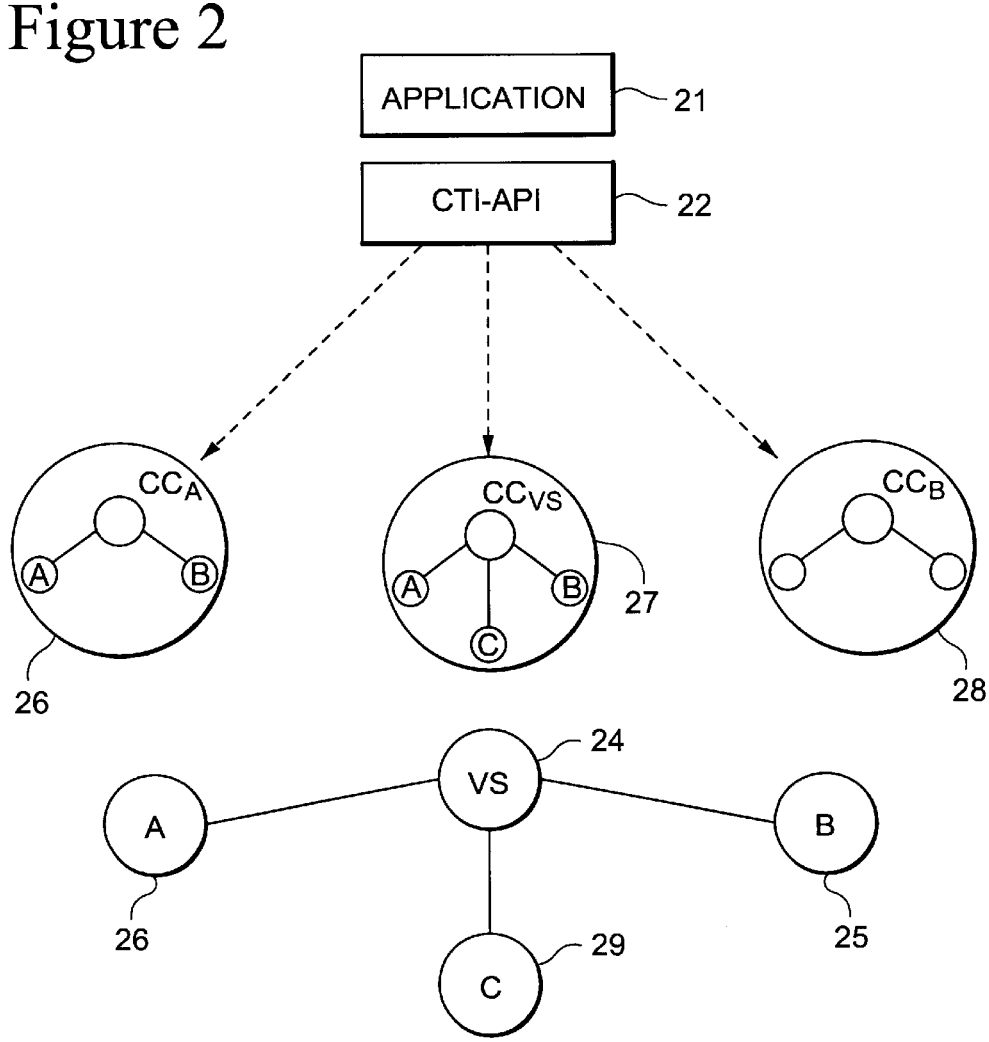
FIG. 2 is a schematic showing a communications system embodying the present invention.

FIG. 2 shows a system embodying the present invention. Application 21, which may again be a call centre application used, for example, to distribute calls between agents in a telemarketing call centre, controls network resources via a computer telephony interface 22. This interface may again be constructed using Sun's JTAPI. However, by contrast with the prior art system, the interface is not limited to using a single call component such as a third party call component dedicated to operating a virtual switch, but instead can operate concurrently a number of different call components including, a first party call component 26 modelling the call from the view of node A, a third party call control component 27 modelling the view of the call from the virtual switch 24 and another first party call control component 28 modelling the call from the viewpoint of the other node B. In this way, the interface 22 fully captures and allows efficient control of all the capabilities of the network. The network in this example includes in addition to an originating node 23 which may be a first PC running an NM client, a virtual switch 24 and another PC node 25 running NM a third node 29 corresponding to a third PC C again running a NetMeeting client. As shown in the diagram, the third node 29 is present in the call component derived from the third party view of the virtual switch 24 but not present in the call components of the end nodes 23, 25.

Figure 3:
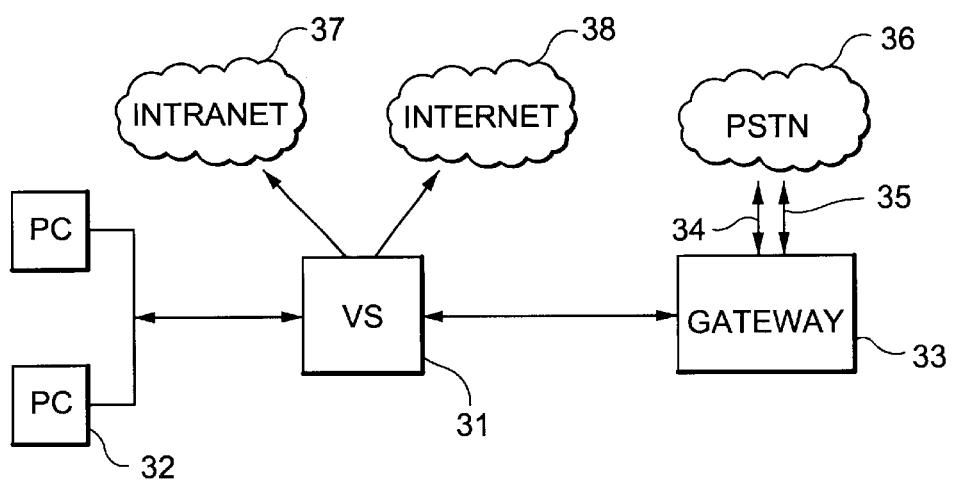
FIG. 3 is a schematic showing a network implementing the system of FIG. 2.

FIG. 3 shows in outline a network suitable for use in implementing the invention. This is termed by the inventors a 2+10 network. A virtual switch 31 using NetMeeting and the H323 protocol in connected via a local area network to a number (for example 10) of personal computer 32. It is also connected via the LAN to a telephony gateway 33. The virtual switch 31 may be a UNIX workstation while the Gateway 33 may be a workstation running Windows NT. The Gateway 33 is connected via two exchange lines 34, 35 to the public switch telephony network 36. The exchange lines may be, for example, ISDN lines. The virtual switch 31, is also connected to an Intranet 37 and to the Internet 38.

Figure 4:
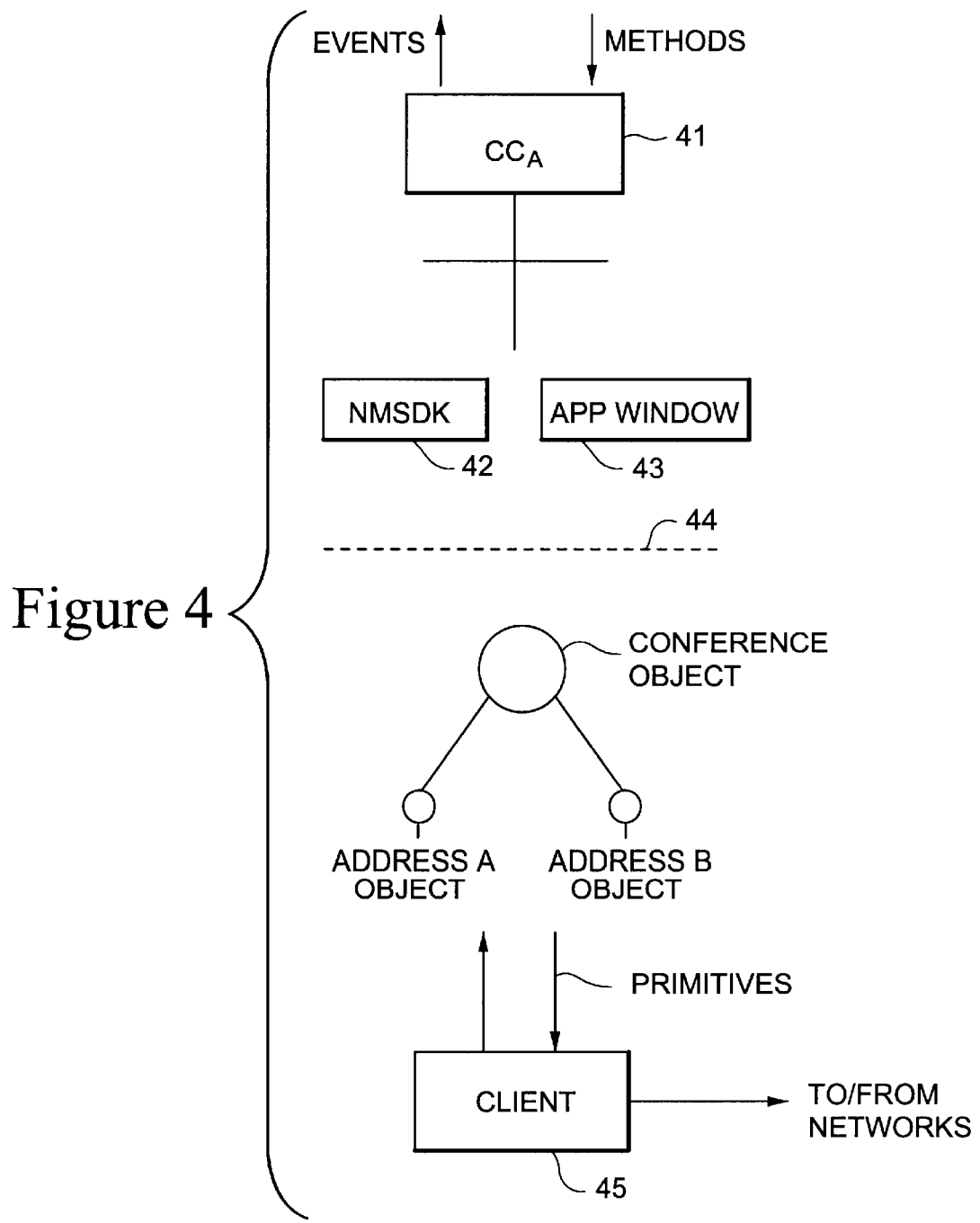
FIG. 4 is a schematic showing components of a PC Node in the network of FIG. 3.
Figure 5:
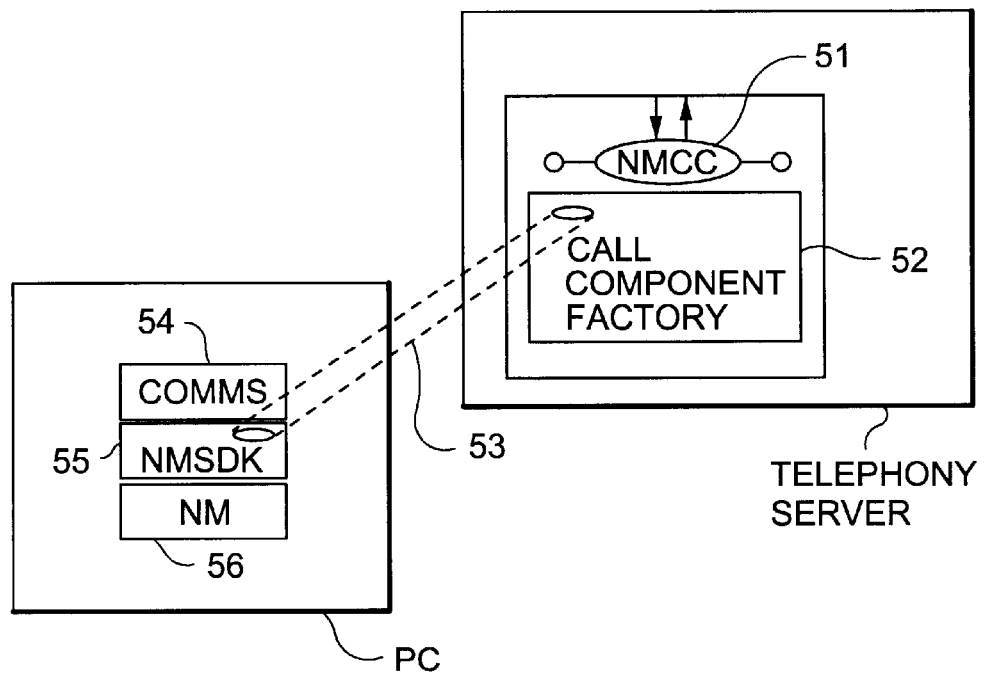
FIG. 5 is a diagram showing schematically the communications link between a telephony server and a PC communications client.

FIG. 4 shows in further detail the components on one of the PCs in the network of FIG. 3. A first party call component 41 controls the telecommunications functions of the PC via the NetMeeting SDK (software developers kit) 42 and the NetMeeting applications window 43. The control interface 44 includes a conference object and address objects for nodes A and B. The interface communicates primitives with the NetMeeting H323 client 45. As shown in FIG. 5, there is a high level communication between different call components. In this example a telephony server includes a NetMeeting call component 51 and a call component factory 52 which communicates via a link 53 which may be a CORBA interface or a sockets interface with a PC. The PC includes a communications application 54 running above the NetMeeting SDK which in turn controls the NetMeeting client 56.

Figure 6A:
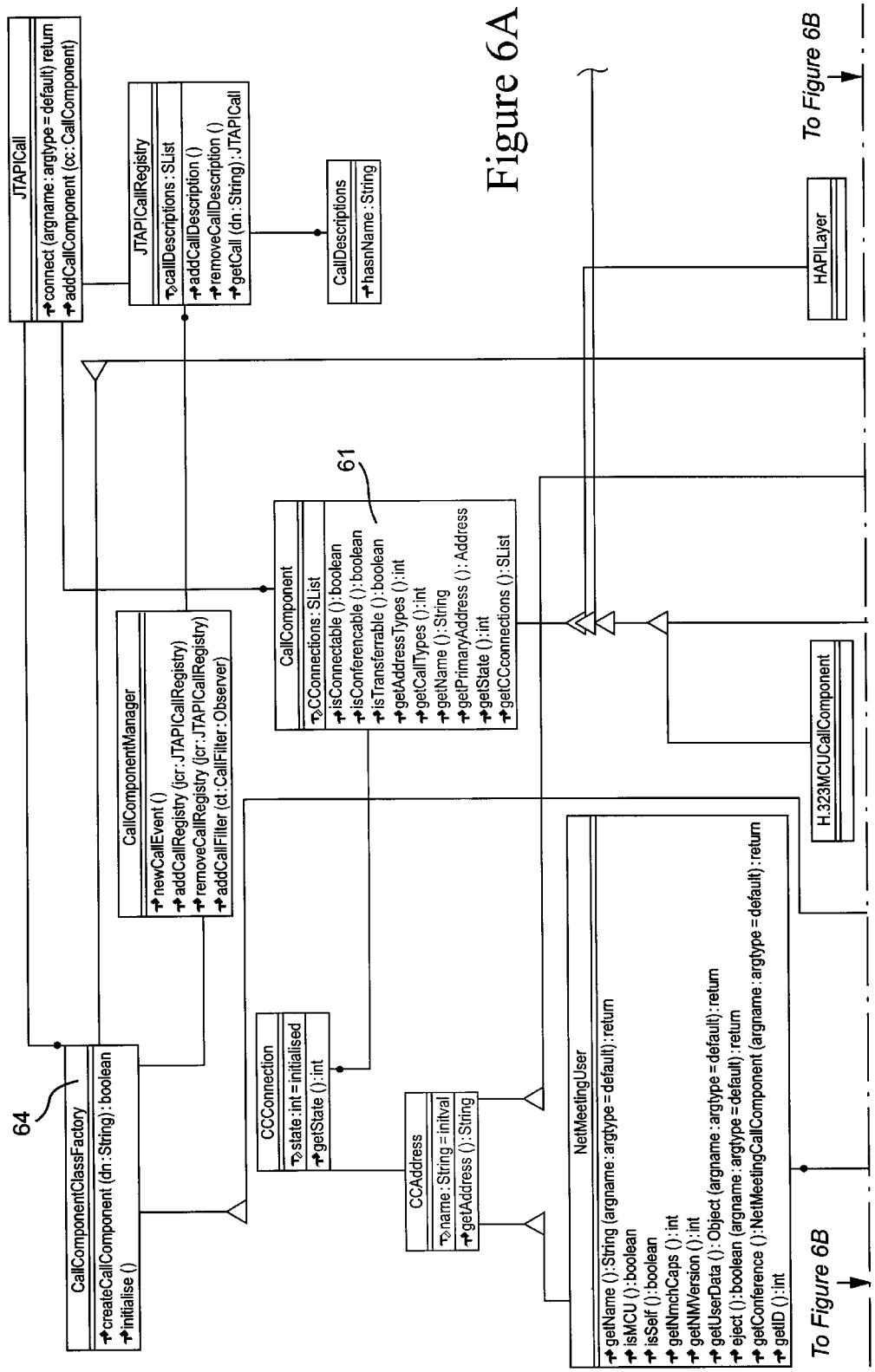
FIG. 6 is an object diagram showing a computer telephony interface implementing the present invention.
Figure 6B:
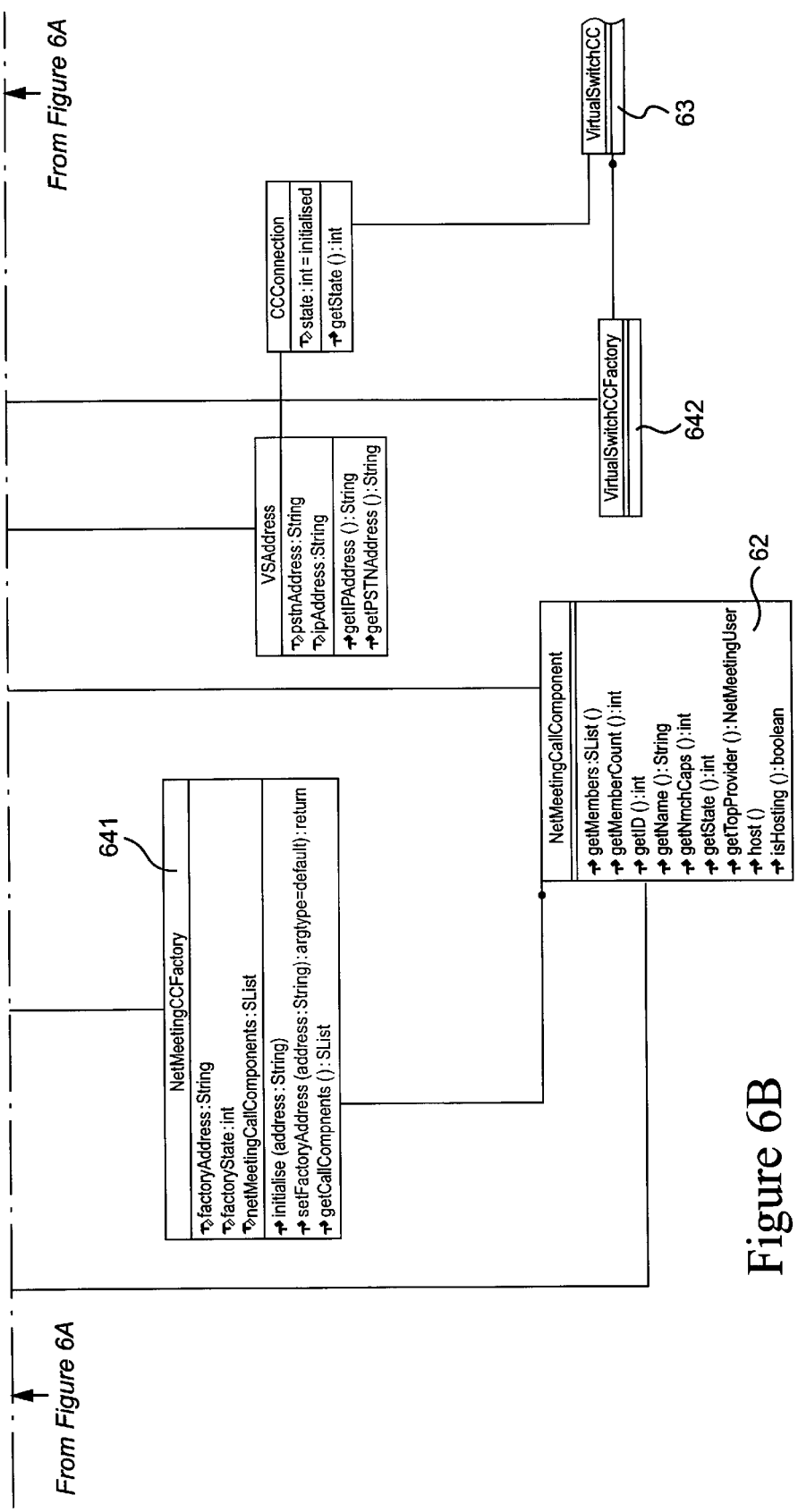

FIG. 6 is a class diagram for a computer telephony interface implementing the invention. This diagram is generated using the rational ROSE tool, and may be used to generate code fragments using that tool. The interface includes a call component class 61 which has child classes including a NetMeeting call component 62 and a virtual switch call component 63. The NetMeeting call component is a first party call component while the virtual switch call component is a third party call component. The generation of instances of the call component 61 is managed by the call component class factory 64. The call component factory 64 has subclasses including a NetMeeting call component factory 641 which generates instances of the NetMeeting call component 62, and a virtual switch call component factory 642 which generates instances of the virtual switch call component 63.

Figure 7:
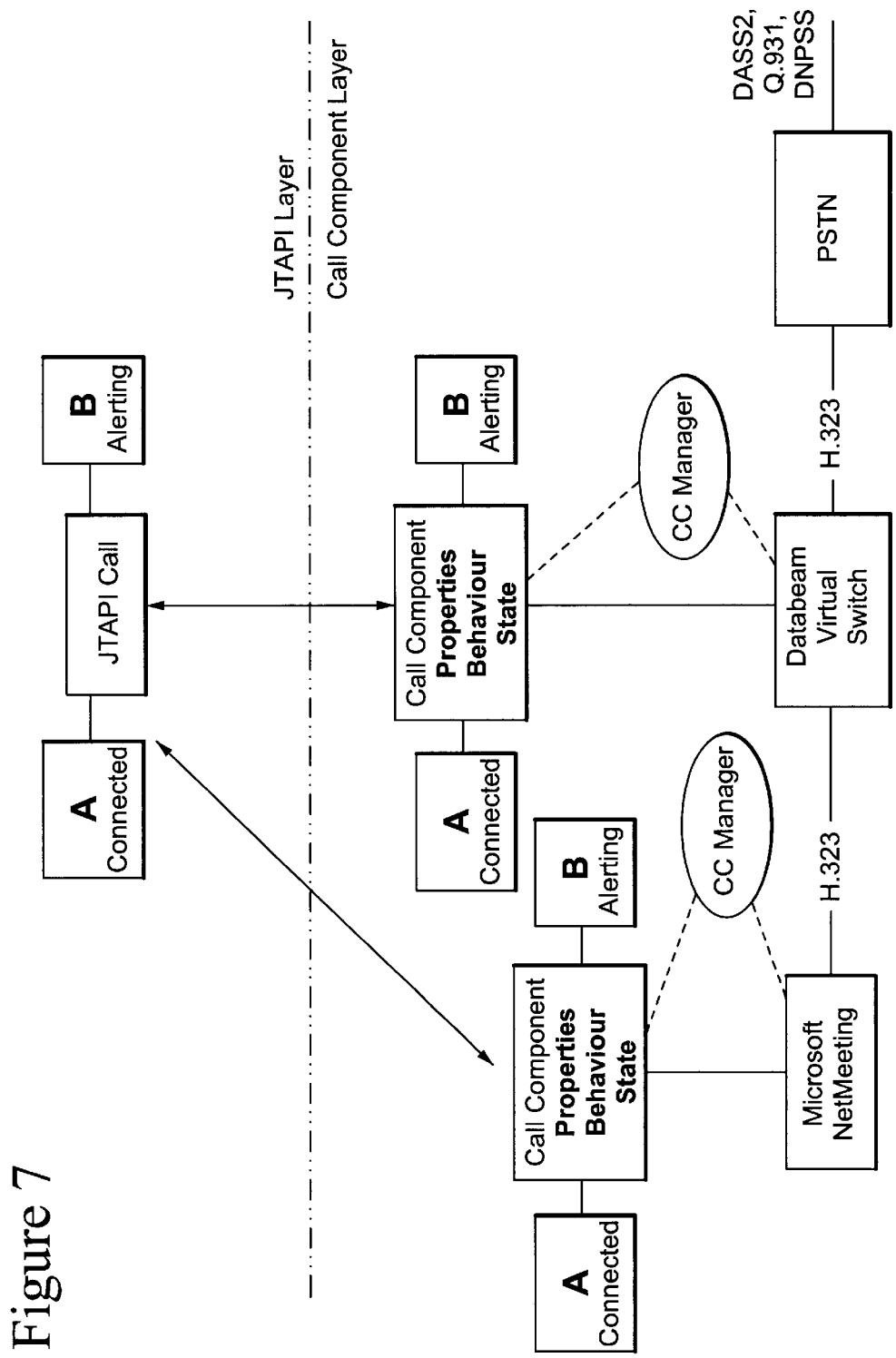
FIG. 7 is a diagram showing a further example of a system embodying the invention.

In a preferred implementation, a call and conference management system, shown in FIG. 7, is constructed using Java and JTAPI. The system provides H.323 IP (Internet Protocol) video/voice and data call capabilities. The system uses thin clients to support net-centric applications including call centre management, conference calls, directory systems and management applications. The system uses concurrently 1st party, 3rd party and "nth" party call components to manage calls across multiple nodes and multiple domains. In operation, each node within a call or conference is modelled as a call component (CC) within a virtual node. The nodes may be physically embodied, e.g., as H.323 clients, TAPI cards, network gatekeepers or gateways, or PBX switches. Each call component is linked back to a single CTI Java Call Model (JCM). Thus during a call across multiple virtual nodes, many call components, including in general both first party and third party call components, are linked back to a single Java Call Model. The list of call components within a Java Call Model is built up dynamically as a call is routed through the system. Provision is made for the JCM to have knowledge of default call components prior to a call or conference being created. For example, the simplest call component is a client call component, corresponding, e.g. to a TAPI card or an H.323 client. For most simple calls, but not in the case of call centre or call routing operations, a client call component is the primary and default call component. The Java Call Model used for simple calls may be the java.core package. A two party or three party call may be established using, e.g., a number of H.323 client call components. However, to handle large conferences, it is prefered to select a call component corresponding to an MCU conference bridge with media mixing capabilities.

Although H.323 in itself is not capable of emulating the functionality of a PBX, this limitation may be overcome by using H.323 virtual switch (VS) also known as gatekeeper technology. This approach allows calls to be modelled with originating and terminating legs. To transfer a call one of the legs is removed and a new one set up to another client. The present system includes a virtual switch call component (VSCC) to model such a virtual switch. When a java.call-control call is requested, the system selects a VSCC by default.

In addition to the use of default or primary call components as described above, additional call components may be added dynamically to a Java Call Model during call set up.

The system shown in FIG. 7 is split into two layers. The JTAPI layer is responsible for presenting simplified views of a call or conference and for integrating the views with routing requests. The call component layer is responsible for modelling a call through a virtual switch and for associating call components with JTAPI calls. These two layers will now be described in further detail.

The JTAPI layer performs as normal from the perspective of an application making use of the JTAPI layer. In this example the JTAPI layer is designed as a single provider system and presents a single API to a range of multimedia and CTI systems. The JTAPI packages modelled within the JTAPI layer are core, callcontrol, and callcentre The JTAPI Call class is able to access at least one call component prior to making a call. That call component is, as discussed previously, the default or primary call component. When an external call enters the system, the JTAPI layer models a corresponding call component and appends the call component to a JTAPI call. The JTAPI call continues to model the overall state of a call as other associated call components become active within the system domain and are appended to the call. In a stable state, the JTAPI call class, when requested to do so by the JTAPI application, interrogates call components to request further options such as call transfers, conferences and gateways. When number translation occurs across gateways, the JTAPI Call models the correct connection state. Finally, when the call ends, the JTAPI call class removes inactive call components and becomes itself inactive.

In the Call Component Layer, call components are arranged to present consistent behaviour, events and properties to the JTAPI call model. The behaviour of the call components offers a range of call control capabilities from connecting address A to address B, to conferencing A,B,C, and D, or routing an incoming call to B. As previously described, the system is designed to allow all components of a call to be modelled by a single JTAPI call model. The Java call model interrogates call components to discover which call components supports a certain function. Table 1 below lists call component capabilities.

The call components have the following states: idle, active and inactive. Idle represents the state before call component connections are added, active occurs during the call whilst there is one or more call component connections, and inactive is the state entered when the call component connections have become disconnected.

In addition to the principle objects and classes described above, a number of ancillary classes are used in the preferred implementation.

CCconnection: for each call component in the active state there will be at least one CCconnection and associated CCAddress. This models the behaviour of the JTAPI call model. The state set of CCConnection includes idle, alerting, ringing, connected. The state set may be extended to include Automatic Call Distribution, queues and IVR states.

CCAddress: this models the behaviour of the Address and has the ability to represent IP Addresses. Two subclasses of this class are NetMeeting User and Virtual Switch User. The JTAPI concepts of Terminal and Terminal Connection are not used.

Call Component Class Factory (3CF): this is a special class for creating calls for a specific node type. A JCM has access to a number of 3CFs before connections are made, representing the capabilities of the CC created by that mechanism. Once the CC is created, the 3CF is no longer consulted by the JCM. Capability enumeration occurs through direct interaction with the CCs. 3CFs are defined for NetMeeting CC and Virtual Switch CC.

Call Component Manager: this exists to capture calls that are presented via a control node only, i.e. calls not created from the JTAPI layer. For example, when a call centre enters the domain from another network, or an existing call is routed through a control node, a new CC is created by the CCM. Subsequently, the CCM interrogates the JTAPI call registry to determine whether a JTAPI call exists. If a JCM exists, then the newly created CC is appended to the JCM. If not, then a new JCM is created and the CC is appended. The CCM may be enhanced to allow filters to be added to monitor nodes in other domains. This permits a remote CCM to monitor for certain types of calls and addresses. For example, it may be necessary for JCM's to exist in two domains, for example so that a call that originates in a site in Singapore is transferred to Hong Kong. Both sites retain an interest in the model of the call in case the call is transferred back, so each has a call model with remote capabilities.

JTAPI Call Registry: this is used to register all active calls within a domain. The class may be implemented as an enhancement to the JTAPI provider class. The call registry is important in that it is used to determine whether CC created via a CCM should be associated with a new JCM (Java Call Model) or with an existing JCM.

TABLE 1

| Properties | Behaviour | Events |
|---|---|---|
| isConnectable() | Connect (Address : String, Address : String) where Address can be IP or E.164, the JCM must have used getAddressTypes to enumerate what the CC supports | Alerting, Ringing, Answered |
| isConferenceable() | Conference (Call, Address) Conference (SList :of CCAddress) | Alerting, Ringing, Answered, ConferenceJoin, Dropped |
| int getAddressTypes() enumerates addresses supported by CC 0001 : IP (DNS name, IP Address, Email, ILS Server/E-mail username) 0010 : E164 int getCallTypes() enumerates call technologies supported by the CC 0001 : H.323 0010 : Telephony 0100 : Multicast SList getConnections() returns connections associated with a CC CCAddress getPrimaryAddress() used to establish if this node is a client (TAPI card or H.323) int getState() initialised, active or inactive. Once CC is in inactive state it will be removed from a JCMs list of CCs | | |
| isTransferrable() | Transfer (Address, Address) | Alerting, Ringing, Answered |

What is claimed is:

1. A communications network comprising:

a plurality of network nodes;

a telephony server arranged in operation to control at least one of said network nodes, said telephony server including a control interface comprising:

a call model comprising information relating to telephone calls made in said communications network and network nodes active in said telephone calls;

call components comprising at least one first party call components and/or at least one third party call components, said first and third party call components arranged in operation to control said telephone calls;

wherein network nodes located at the origin or destination of a telephone call and active in said telephone call are represented by first party call components which can control said telephone call from the view of the node at the origin or destination of said telephone call;

wherein network nodes located between the origin and destination of said telephone call and active in said telephone call are represented by third party call components which can control said telephone call from the view of the node between the origin and destination of said telephone call; and wherein each first party and third party call component for said telephone call is linked to a single call model.

2. A telephony server for connection in a communications network according to claim 1.

3. A computer telephony interface for installation in a telephony server according to claim 2.

4. A machine readable medium carrying software adapted to implement a computer telephony interface according to claim 3.

5. A method of operating a telephone server installed in a communications network comprising a plurality of network nodes, said telephony server comprising a call model comprising information relating to telephone calls made in said communications network and call components arranged in operation to control said telephone calls, said method comprising the steps of:

a) representing each network node active in a telephone call with a call component;

including at least one first party call component and/or at least one third party call component;

wherein network nodes located at the origin or destination of a telephone call and active in said telephone call are represented by first party call components which can control said telephone call from the view of the node at the origin or destination of said telephone call;

wherein network nodes located between the origin and destination of said telephone call and active in said telephone call are represented by third party call components which can control said telephone call from the view of the node between the origin and destination of said telephone call;

b) selecting at least one of said call components;

c) incorporating each selected call component in said call model; and d) controlling via said call model said network nodes corresponding to each selected call component, and thereby establishing a call in said communications network.

6. A machine readable medium carrying software adapted to implement the method according to claim 5.

* * * * *